United States Patent
Heroux et al.

(10) Patent No.: US 10,088,627 B1
(45) Date of Patent: Oct. 2, 2018

(54) WAVEGUIDE CORNER STRUCTURE

(71) Applicant: INTERNATIONAL BUSINESS MACHINES CORPORATION, Armonk, NY (US)

(72) Inventors: Jean Benoit Heroux, Kawasaki (JP); Hsiang Han Hsu, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/472,898

(22) Filed: Mar. 29, 2017

(51) Int. Cl.
  *G02B 6/12* (2006.01)
  *G02B 6/125* (2006.01)
  *G02B 6/122* (2006.01)

(52) U.S. Cl.
  CPC .......... *G02B 6/125* (2013.01); *G02B 6/122* (2013.01); *G02B 2006/12104* (2013.01)

(58) Field of Classification Search
  USPC ..................................... 385/14, 18
  See application file for complete search history.

(56) References Cited

U.S. PATENT DOCUMENTS

| | | | |
|---|---|---|---|
| 8,873,912 B2 | 10/2014 | Dangel et al. | |
| 2016/0097890 A1 | 4/2016 | Vasylyev | |
| 2017/0017042 A1* | 1/2017 | Menard | G02B 6/3596 |

OTHER PUBLICATIONS

Dou, X. et al., "Highly flexible polymeric optical waveguide for out-of-plane optical interconnects" Optics Express (Jul. 2010) pp. 16227-16233, vol. 18, No. 15.
Sefunc, M.A. et al., "Low-loss sharp bends in polymer waveguides enabled by the introduction of a thin metal layer" Optics Express (Dec. 2013) pp. 29808-29817, vol. 21, No. 24.
Pitwon, R. et al., "Polymer optical waveguides with reduced in-plane bend loss for electro-optical PCBs" Proceedings of SPIE—The International Society for Optical Engineering (Feb. 2012) pp. 1-9, vol. 8264.
Zakariyah, S.S., "Laser ablation for polymer waveguide fabrication" Micromachining Techniques for Fabrication of Micro and Nano Structures (Feb. 2012) pp. 109-130, Chapter 6.
Bamiedakis, N. et al., "Compact Multimode Polymer Waveguide Bends for Board-Level Optical Interconnects" Journal of Lightwave Technology (Jul. 2013) pp. 2370-2375, vol. 31, No. 14.
Sefunc, M.A. "Reduction of bend losses in polymer waveguides by thin metallic layers" IEEE Photonics Benelux Chapter Annual Meeting (Jan. 2013) pp. 1-4.

* cited by examiner

*Primary Examiner* — Eric Wong
(74) *Attorney, Agent, or Firm* — Tutunjian & Bitetto, P.C.; Vazken Alexanian

(57) ABSTRACT

A waveguide corner structure includes a plate on which mirrors are formed; and a waveguide member including waveguide cores and holes, each of the holes being drilled in a portion replacing an angular bent portion of corresponding waveguide cores. The plate is mounted on the waveguide member so that each of the mirrors is inserted in corresponding one of the holes for a change of a direction of a light beam at the portion of corresponding waveguide cores.

20 Claims, 14 Drawing Sheets

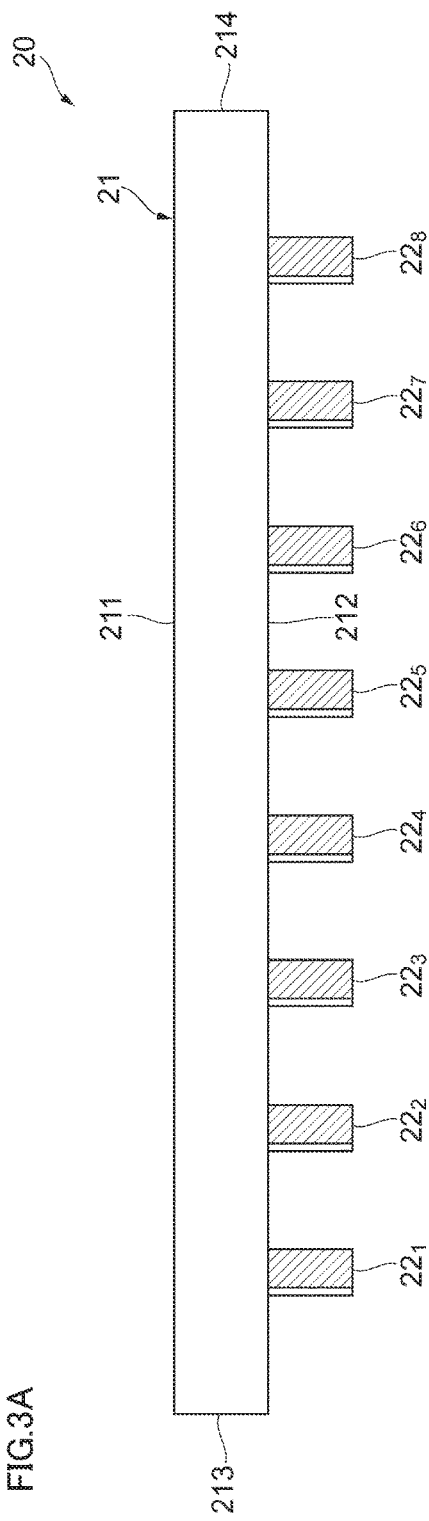
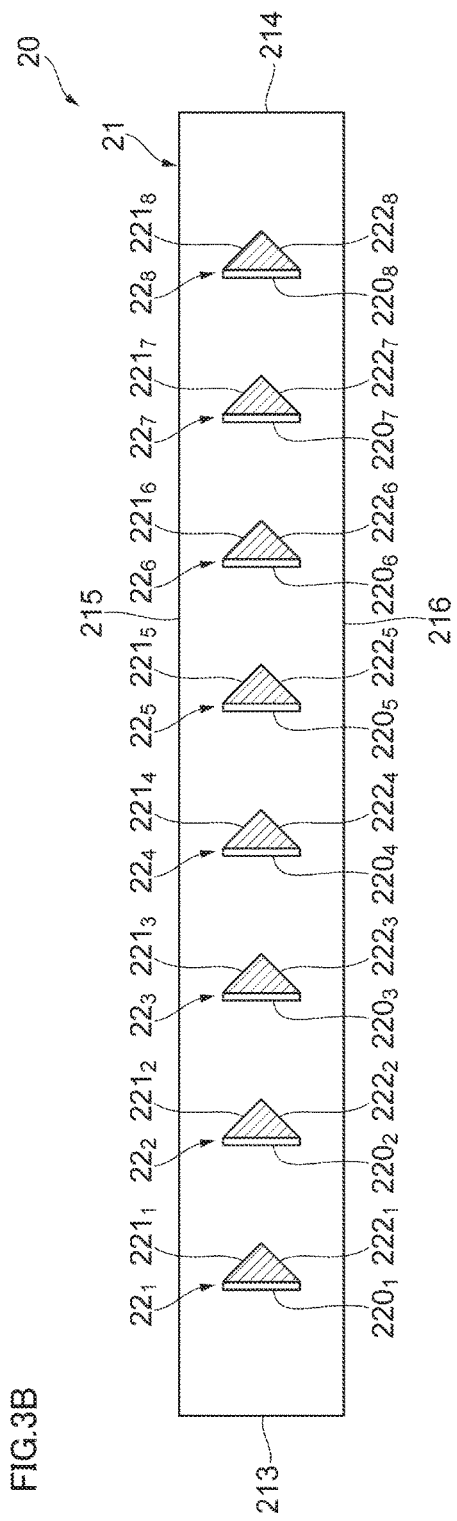

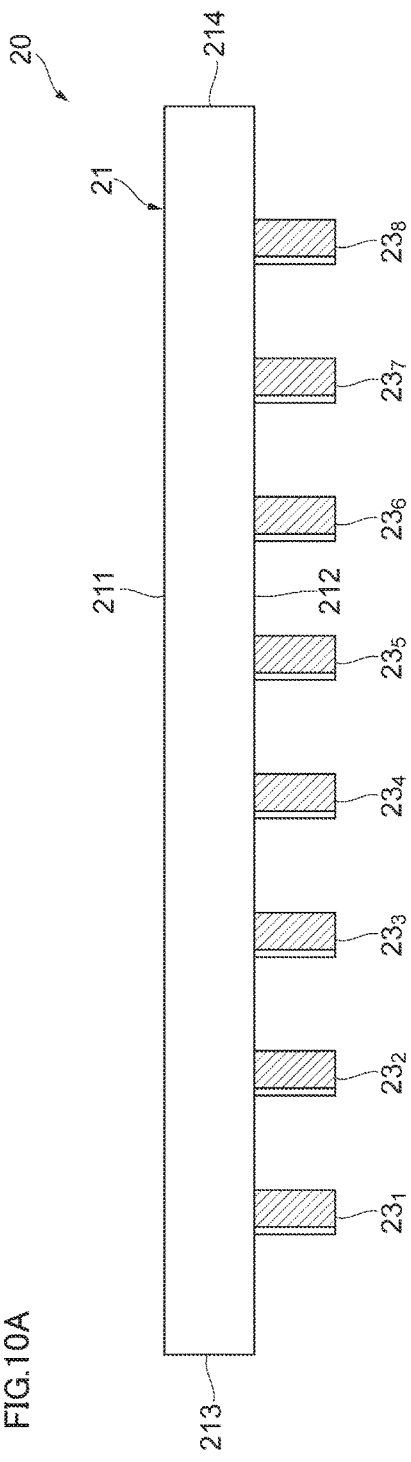
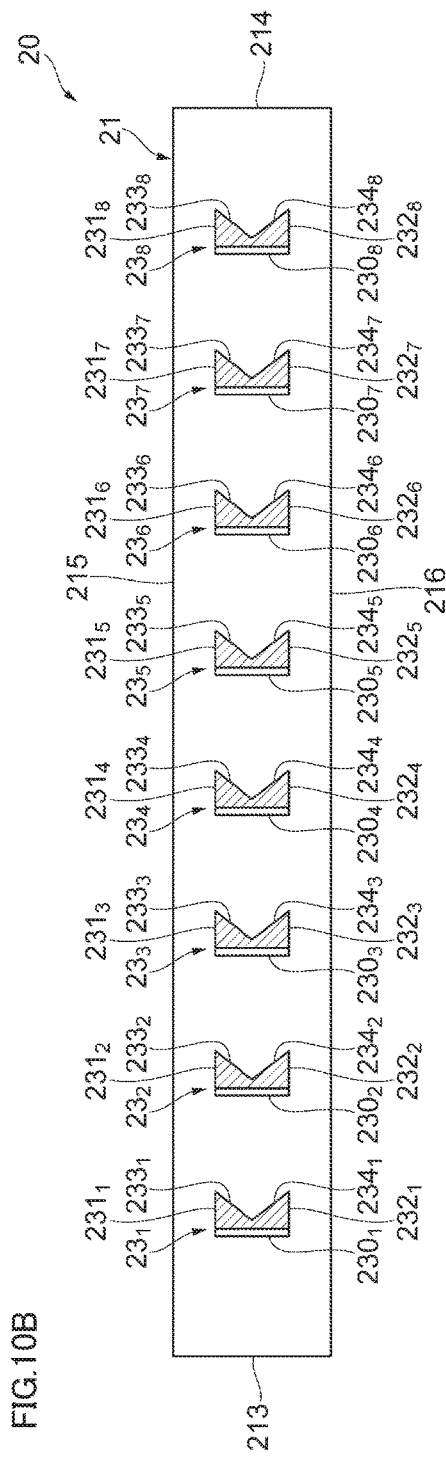

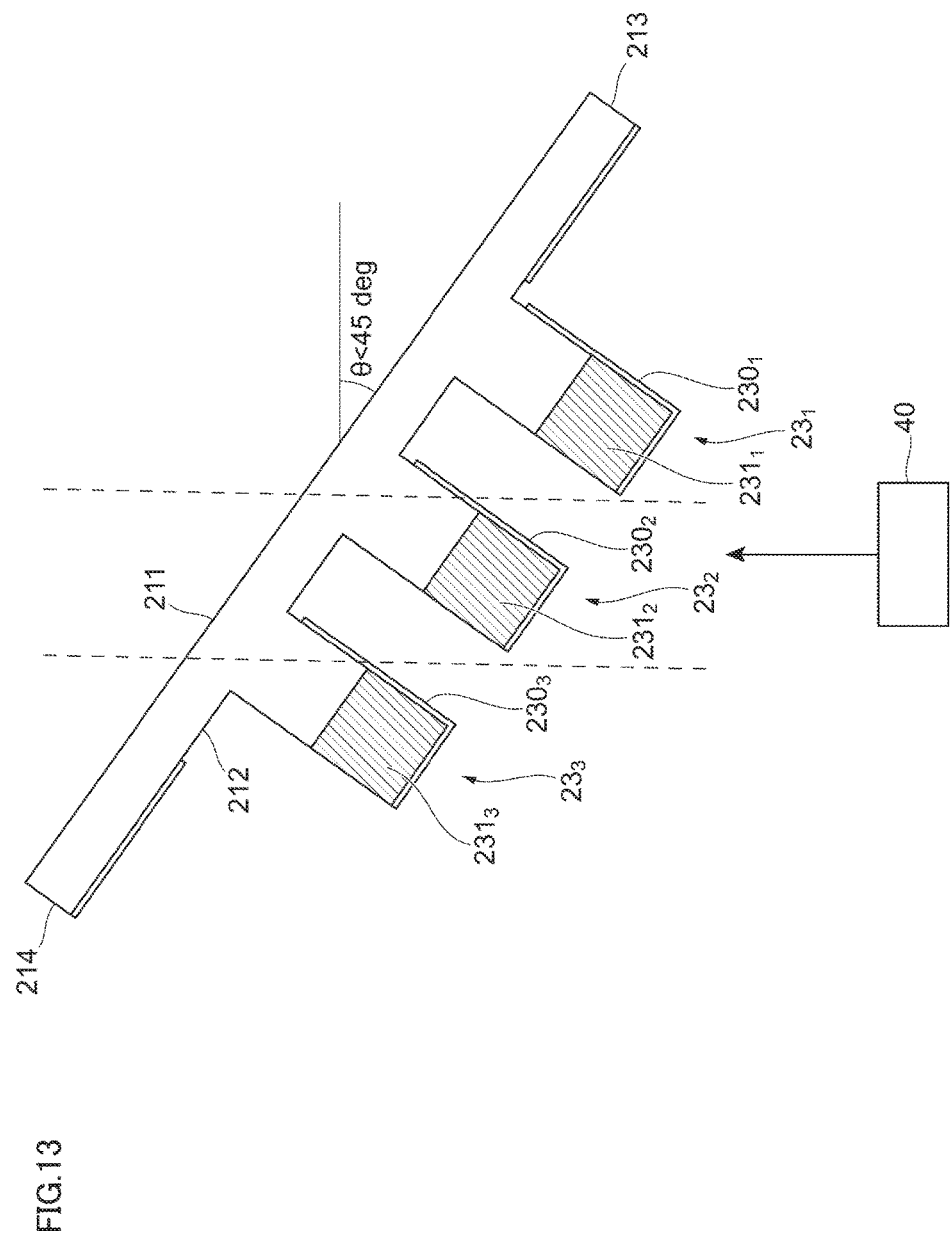

WAVEGUIDE CORNER STRUCTURE

BACKGROUND

Technical Field

The present invention relates to a waveguide corner structure.

Related Art

Various techniques are known involving the use of waveguide structures.

SUMMARY

According to an embodiment of the present invention, there is provided a waveguide corner structure. The waveguide corner structure includes a plate on which a plurality of mirrors are formed. The waveguide corner structure further includes a waveguide member including a plurality of waveguide cores and a plurality of holes. Each of the plurality of holes is drilled in a portion replacing an angular bent portion of corresponding one of the plurality of waveguide cores. Furthermore, in the waveguide corner structure, the plate is mounted on the waveguide member so that each of the plurality of mirrors is inserted in corresponding one of the plurality of holes for a change of a direction of a light beam at the portion of corresponding one of the plurality of waveguide cores.

According to another embodiment of the present invention, there is provided a waveguide corner structure. The waveguide corner structure includes a plate on which a plurality of mirrors are formed. The waveguide corner structure further includes a waveguide member including a plurality of waveguide cores and a groove. The groove is cut in an area extending over a plurality of portions replacing a plurality of angular bent portions of the plurality of waveguide cores. Furthermore, in the waveguide corner structure, the plate is mounted on the waveguide member so that each of the plurality of mirrors is inserted in the groove for a change of a direction of a light beam at corresponding one of the plurality of portions of the plurality of waveguide cores.

According to yet another embodiment of the present invention, there is provided a method for fabricating a waveguide corner structure. The method includes forming a plurality of mirrors on a plate. The method further includes fabricating a waveguide member including a plurality of waveguide cores and a plurality of holes. Each of the plurality of holes is drilled in a portion replacing an angular bent portion of corresponding one of the plurality of waveguide cores. The method furthermore includes mounting the plate on the waveguide member so that each of the plurality of mirrors is inserted in corresponding one of the plurality of holes for a change of a direction of a light beam at the portion of corresponding one of the plurality of waveguide cores.

According to still another embodiment of the present invention, there is provided a method for fabricating a waveguide corner structure. The method includes forming a plurality of mirrors on a plate. The method further includes fabricating a waveguide member including a plurality of waveguide cores and a groove. The groove is cut in an area extending over a plurality of portions replacing a plurality of angular bent portions of the plurality of waveguide cores. The method furthermore includes mounting the plate on the waveguide member so that each of the plurality of mirrors is inserted in the groove for a change of a direction of a light beam at corresponding one of the plurality of portions of the plurality of waveguide cores.

BRIEF DESCRIPTION OF THE DRAWINGS

FIGS. 3A and 3B depict a side view and a bottom view of a plate according to the first exemplary embodiment.

FIGS. 10A and 10B depict a side view and a bottom view of a plate according to the second exemplary embodiment.

FIG. 13 depicts a detailed configuration for metal evaporation according to the second exemplary embodiment.

DETAILED DESCRIPTION

Hereinafter, exemplary embodiments of the present invention will be described in detail with reference to the attached drawings.

It is to be noted that the present invention is not limited to these exemplary embodiments to be given below and may be implemented with various modifications within the scope of the present invention. In addition, the drawings used herein are for purposes of illustration, and may not show actual dimensions.

Optical waveguides with waveguide core arrays may have a low core-clad index contrast to reduce optical loss of light propagating through. However, the low core-clad index contrast may enlarge optical loss in bent portions of the waveguide core arrays and thus prevent the optical waveguides from being fabricated in a compact size. In view of this, the exemplary embodiments provide waveguide corner structures in which the bent portions formed not into curved shapes but into angular shapes (e.g., rectangular shapes) are replaced by micro-mirrors to design the bent portions in a compact size.

Figure 1:
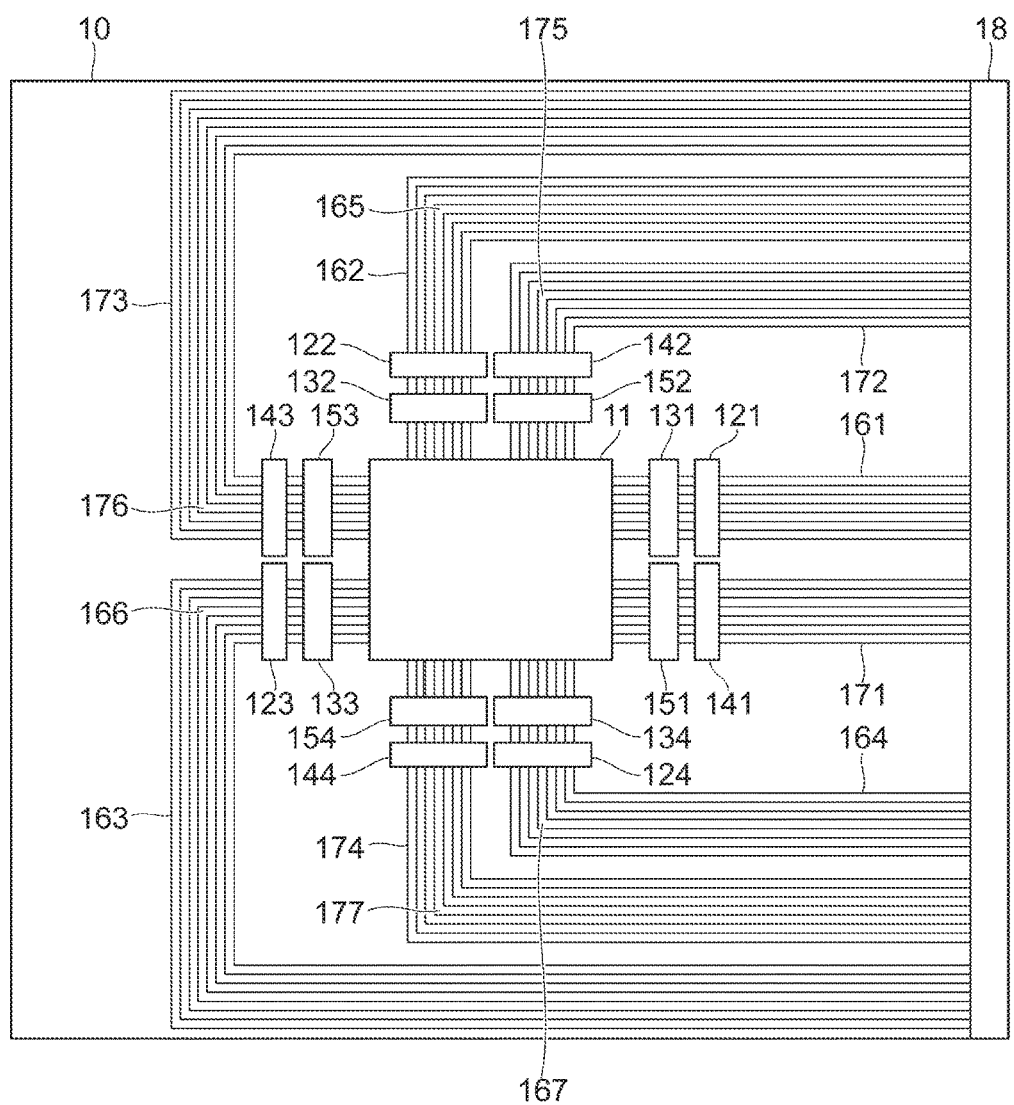
FIG. 1 depicts an example of a hardware configuration of a multi-chip module according to exemplary embodiments of the present invention.

Referring to FIG. 1, there is shown an example of a hardware configuration of a multi-chip module (MCM) 10 according to the exemplary embodiments. As shown in the figure, the MCM 10 may include a central processing unit (CPU) 11, vertical cavity surface emitting laser (VCSEL) array chips 121 to 124, laser diode driver (LDD) array chips 131 to 134, photodiode (PD) array chips 141 to 144, and trans-impedance amplifier (TIA) array chips 151 to 154. Further, as shown in the figure, the MCM 10 may include waveguides 161 to 164 connected to the VCSEL array chips 121 to 124, respectively, and waveguides 171 to 174 connected to the PD array chips 141 to 144, respectively. Furthermore, as shown in the figure, the MCM 10 may include a fiber connector 18 connected to the waveguides 161 to 164 and 171 to 174.

Each of the waveguides 161 to 164 and 171 to 174 may include 12 waveguide cores, and a pitch between adjacent two of 12 waveguide cores may be 62.5, 125 or 250 micrometers. In the following description, a waveguide is assumed to include eight waveguide cores for convenience of illustration, although it may include any number of waveguide cores.

The waveguides 162 to 164 and 172 to 174 may include waveguide corners 165 to 167 and 175 to 177, respectively, as one example of portions replacing angular bent portions. Without the waveguide corners 165 to 167 and 175 to 177, the MCM 10 would take one or more fiber connectors on each of the four sides thereof. To the contrary, with the waveguide corners 165 to 167 and 175 to 177, the MCM 10 has only to take one fiber connector 18 on a single side thereof. Such structure of the MCM 10 may be better for easy configuration of an optical communication system including the MCM 10.

First, an explanation is given about the fabrication of waveguide corner structures of the waveguide corners (e.g., the waveguide corners 165 to 167 and 175 to 177 in FIG. 1) according to the first exemplary embodiment.

Figure 2:
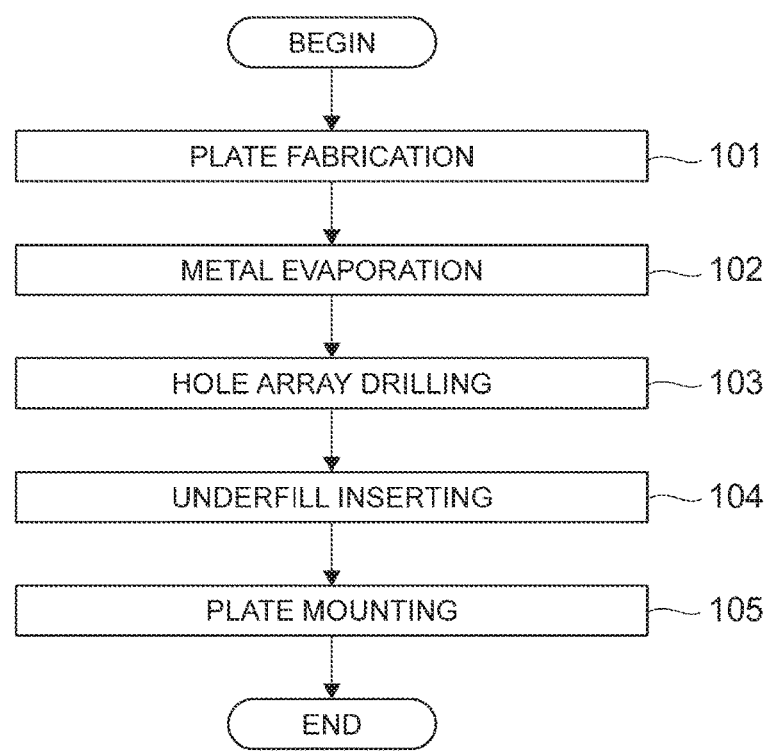
FIG. 2 depicts a flowchart representing an example of a fabrication procedure of waveguide corner structures according to the first exemplary embodiment.

Referring to FIG. 2, there is shown a flowchart representing an example of a fabrication procedure of the waveguide corner structures according to the first exemplary embodiment. As shown in FIG. 2, the fabrication procedure may include, in the time order, a plate fabrication step 101, a metal evaporation step 102, a hole array drilling step 103, an underfill inserting step 104, and a plate mounting step 105.

Referring to FIGS. 3A and 3B, there are shown a side view and a bottom view of a plate structure 20 after the plate fabrication step 101 and the metal evaporation step 102 are completed. The plate structure 20 may include a plate 21 having a top surface 211, a bottom surface 212, and side surfaces 213 to 216. The plate structure 20 may further include mirrors $22_1$ to $22_8$. As shown in FIG. 3A, the mirrors $22_1$ to $22_8$ may be formed on the bottom surface 212 of the plate 21 at the plate fabrication step 101. Each of the mirrors $22_1$ to $22_8$ may have a reflection layer by being coated with metal (e.g., gold), as indicated by a thin rectangle on the left side thereof, at the metal evaporation step 102. As shown in FIG. 3B, the mirror $22_1$ which is in a triangular prism having side surfaces $220_1$, $221_1$, and $222_1$, the mirror $22_2$ which is in a triangular prism having side surfaces $220_2$, $221_2$, and $222_2$, the mirror $22_3$ which is in a triangular prism having side surfaces $220_3$, $221_3$, and $222_3$, and so on may be formed on the plate 20 at the plate fabrication step 101. The reflection layers may be formed on the side surfaces $220_1$ to $220_8$ of the mirrors $22_1$ to $22_8$ by being coated with metal, as indicated by a thin rectangle, at the metal evaporation step 102. Note that the plate structure 20 may be fabricated using high-precision printing techniques such as 2.5D printing techniques.

Figure 4A:
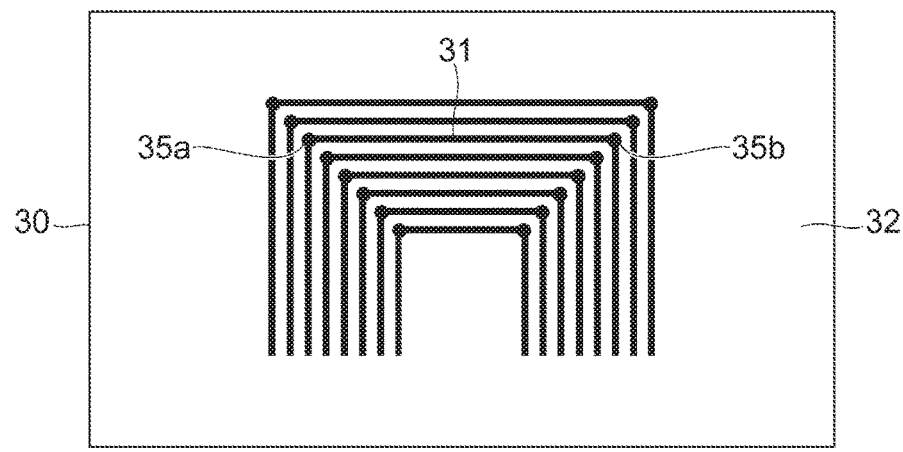
FIGS. 4A, 4B and 4C depict top views of a waveguide structure according to the first exemplary embodiment.
Figure 4B:
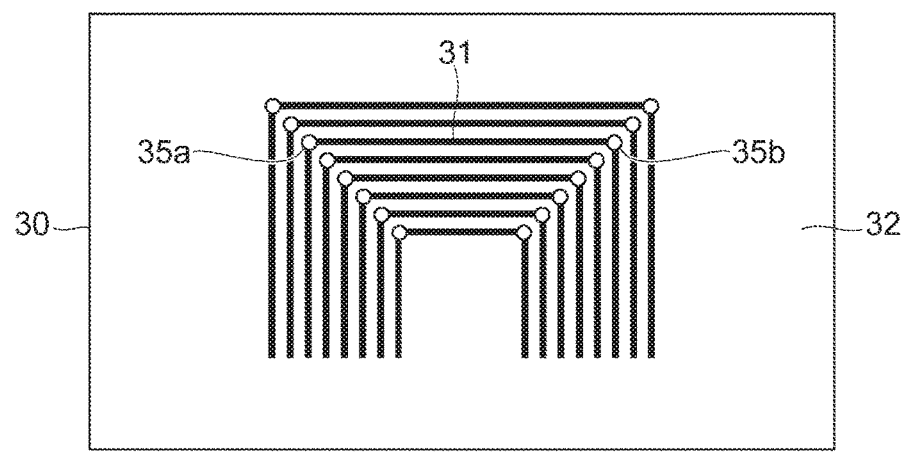
Figure 4C:
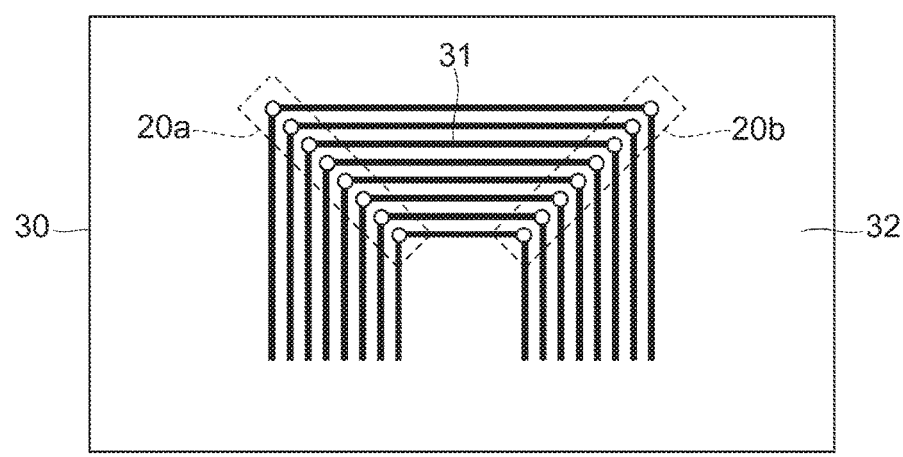

Referring to FIGS. 4A, 4B and 4C, there are shown top views of a waveguide structure 30 while the hole array drilling step 103, the underfill inserting step 104, and the plate mounting step 105 are executed. The waveguide structure 30 may serve as one example of a waveguide member and include a waveguide core array 31 and a side clad 32. First, as shown in FIG. 4A, hole arrays 35a and 35b may be drilled in the right and left corners of the waveguide core array 31, respectively, at the hole array drilling step 103. At this step, each of holes included in the hole array 35a may be drilled in corresponding one of waveguide cores included in the waveguide core array 31, and each of holes included in the hole array 35b may be drilled in corresponding one of waveguide cores included in the waveguide core array 31. Next, as shown in FIG. 4B, an underfill may be inserted in each of the holes included in the hole arrays 35a and 35b at the underfill inserting step 104. Subsequently, as shown in FIG. 4C, plate structures 20a and 20b, each having the same structure as the plate structure 20, may be mounted from above on the right and left corners of the waveguide core array 31, respectively, at the plate mounting step 105. At this step, each of the mirrors of the plate structures 20a may be inserted to corresponding one of the holes included in the hole array 35a and each of the mirrors of the plate structures 20b may be inserted to corresponding one of the holes included in the hole array 35b.

Figure 5A:
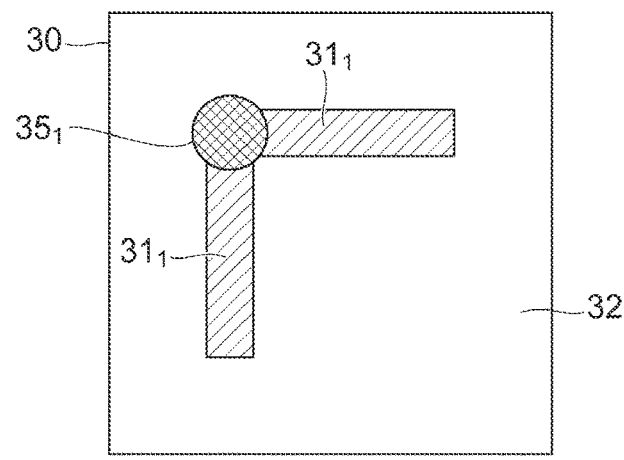
FIGS. 5A, 5B and 5C depict top views of the waveguide structure according to the first exemplary embodiment, which focus on one waveguide core.
Figure 5B:
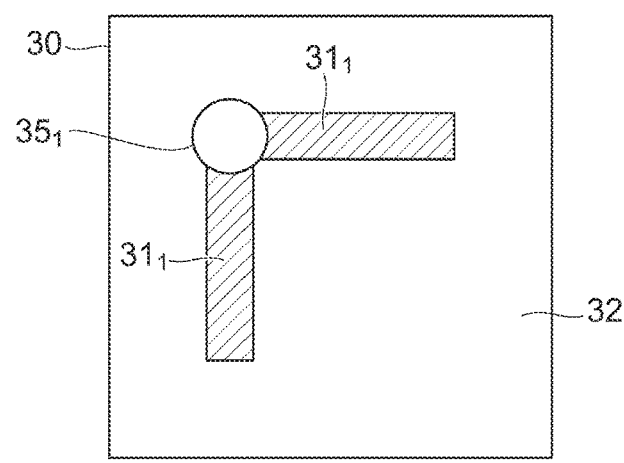
Figure 5C:
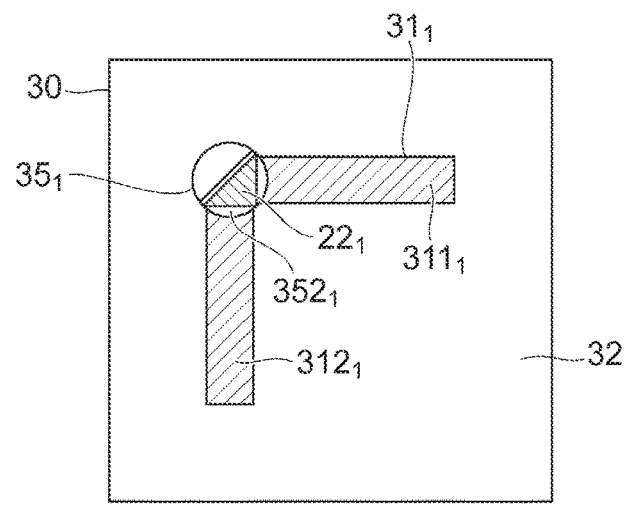

Referring to FIGS. 5A, 5B and 5C, there are shown top views of the waveguide structure 30, which focus on one waveguide core (assumed to be core number 1). First, as shown in FIG. 5A, a hole $35_1$ may be drilled in a corner of a waveguide core $31_1$ at the hole array drilling step 103. Next, as shown in FIG. 5B, an underfill may be inserted in the hole $35_1$ at the underfill inserting step 104. Subsequently, as shown in FIG. 5C, a mirror $22_1$ may be inserted to the hole $35_1$ at the plate mounting step 105. This configuration may enable the reflection layer of the mirror $22_1$ to change the direction of a light beam going through a linear part $311_1$ of the waveguide core $31_1$ so that the light beam goes into a linear part $312_1$ of the waveguide core $31_1$. Assuming that a core index is n1 and a clad index is n2, the mirror $22_1$ may have a refraction index equal to n1 and the underfill may have a refraction index equal to n2. Alternatively, the mirror $22_1$ may have a refraction index close to or higher than n1 and the underfill may have a refraction index close to or lower than n2. Note that the term "close to n" indicates "higher than a predetermined refraction index slightly lower than n and lower than a predetermined refraction index slightly higher than n". By setting the refraction index of the mirror $22_1$ and the underfill in this manner, the core-clad index contrast may be preserved between the mirror $22_1$ and the underfill. That is, even though the light beam going through the linear part $311_1$ meets an interface between the mirror $22_1$ and the underfill in a clearance $352_1$, the light beam may be reflected by a total internal reflection mechanism on the interface, and then the reflection layer of the mirror $22_1$ may change the direction of the light beam so that the light beam goes into the linear part $312_1$.

Next, an explanation is given about two examples of patterns of materials for the fabrication of the plate structure 20 at the plate fabrication step 101.

Figure 6A:
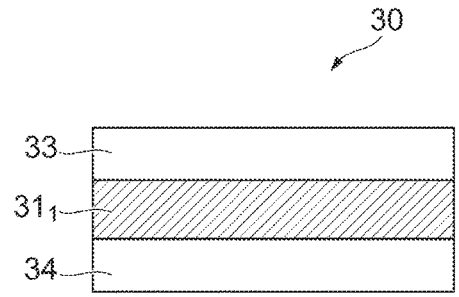
FIGS. 6A, 6B and 6C depict side views, respectively, of the waveguide structure, the first example of the plate structure, and an assembly of the first example of the plate structure and the waveguide structure according to the first and the second exemplary embodiments.
Figure 6B:
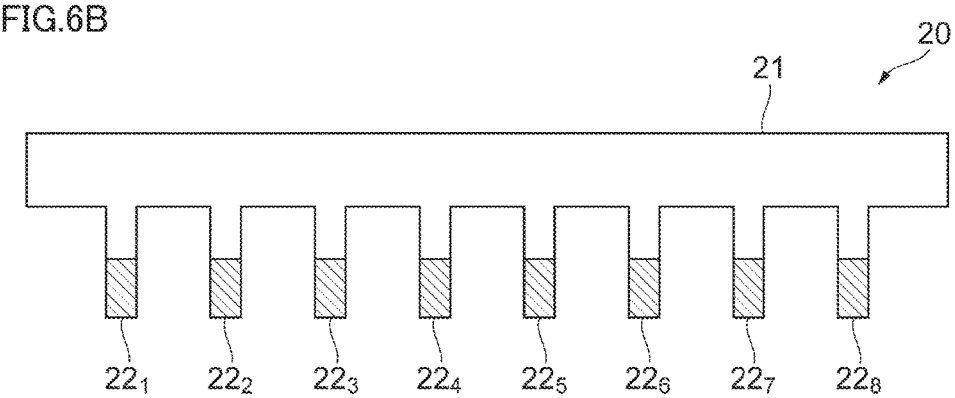
Figure 6C:
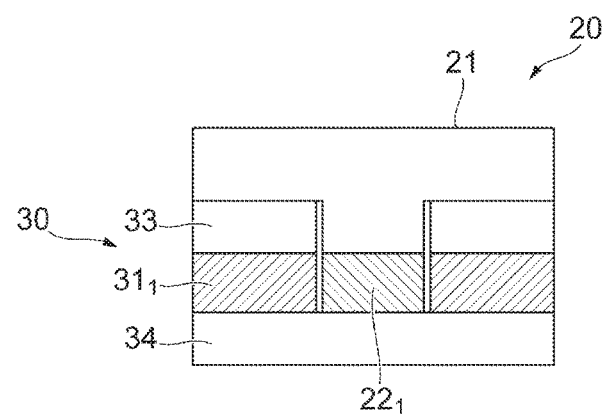

Referring to FIGS. 6A, 6B and 6C, there are shown side views, respectively, of the waveguide structure 30, the first example of the plate structure 20, and an assembly of the first example of the plate structure 20 and the waveguide structure 30. The side view of the waveguide structure 30 is assumed to be a cross section view of a part including the waveguide core $31_1$. Thus, in FIG. 6A, the side view of the waveguide structure 30 shows the waveguide core $31_1$, a top clad 33 and a bottom clad 34. The waveguide core $31_1$ is assumed to have a refraction index n1, and a top clad 33 and a bottom clad 34 are assumed to have a refraction index n2. In this case, the lower parts of the mirrors $22_1$ to $22_8$ may be formed of a material with a refraction index equal to n1, as indicated by hatched areas in FIG. 6B. Alternatively, the lower parts of the mirrors $22_1$ to $22_8$ may be formed of a material with a refraction index close to or higher than n1. The plate 21 and the upper parts of the mirrors $22_1$ to $22_8$ may be formed of a material with the refraction index n2, as indicated by a white area in FIG. 6B. Alternatively, the plate 21 and the upper parts of the mirrors $22_1$ to $22_8$ may be formed of a material with a refraction index lower than the refraction index of the lower parts of the mirrors $22_1$ to $22_8$ (e.g., a refraction index close to or lower than n2). Further, as shown in FIG. 6C, the mirror $22_1$ may be inserted to the hole $35_1$ so that the upper part of the mirror $22_1$ is positioned at the same level as the top clad 33 and the lower part of the mirror $22_1$ is positioned at the same level as the waveguide core $31_1$. By this configuration, a light beam may be totally reflected on an interface between the upper part and the lower part of the mirror $22_1$. Thus, optical loss of the light beam on the corner of the waveguide core $31_1$ may be small.

Figure 7A:
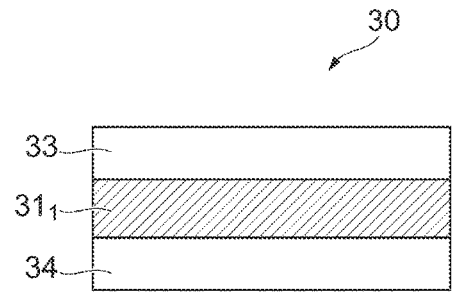
FIGS. 7A, 7B and 7C depict side views, respectively, of the waveguide structure, the second example of the plate structure, and an assembly of the second example of the plate structure and the waveguide structure according to the first and the second exemplary embodiments.
Figure 7B:
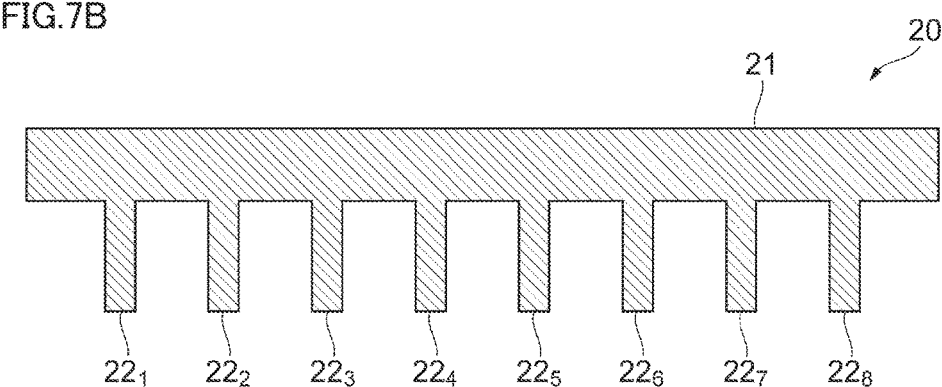
Figure 7C:
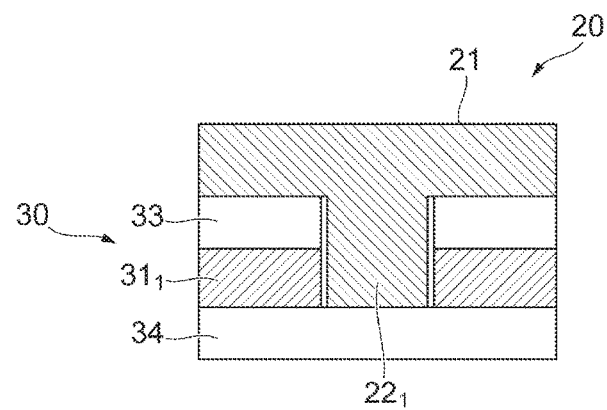

Referring to FIGS. 7A, 7B and 7C, there are shown side views, respectively, of the waveguide structure 30, the second example of the plate structure 20, and an assembly of the second example of the plate structure 20 and the waveguide structure 30. The side view of the waveguide structure 30 is assumed to be a cross section view of a part including the waveguide core $31_1$. Thus, in FIG. 7A, the side view of the waveguide structure 30 shows the waveguide core $31_1$, a top clad 33 and a bottom clad 34. The waveguide core $31_1$ is assumed to have a refraction index n1, and a top clad 33 and a bottom clad 34 are assumed to have a refraction index n2. In this case, both the plate 21 and the mirrors $22_1$ to $22_8$ may be formed of a uniform material with a refraction index equal to n1, as indicated by a hatched area in FIG. 7B. Alternatively, both the plate 21 and the mirrors $22_1$ to $22_8$ may be formed of a material with a refraction index close to or higher than n1. Further, as shown in FIG. 7C, the mirror $22_1$ may be inserted to the hole $35_1$ so that the mirror $22_1$ is positioned at the same level as the top clad 33 and the waveguide core $31_1$. This configuration may facilitate the fabrication of the plate structure 20, although it increases optical loss of the light beam on the corner of the waveguide core $31_1$ in comparison with the configuration shown in FIGS. 6A, 6B and 6C.

Figure 8:
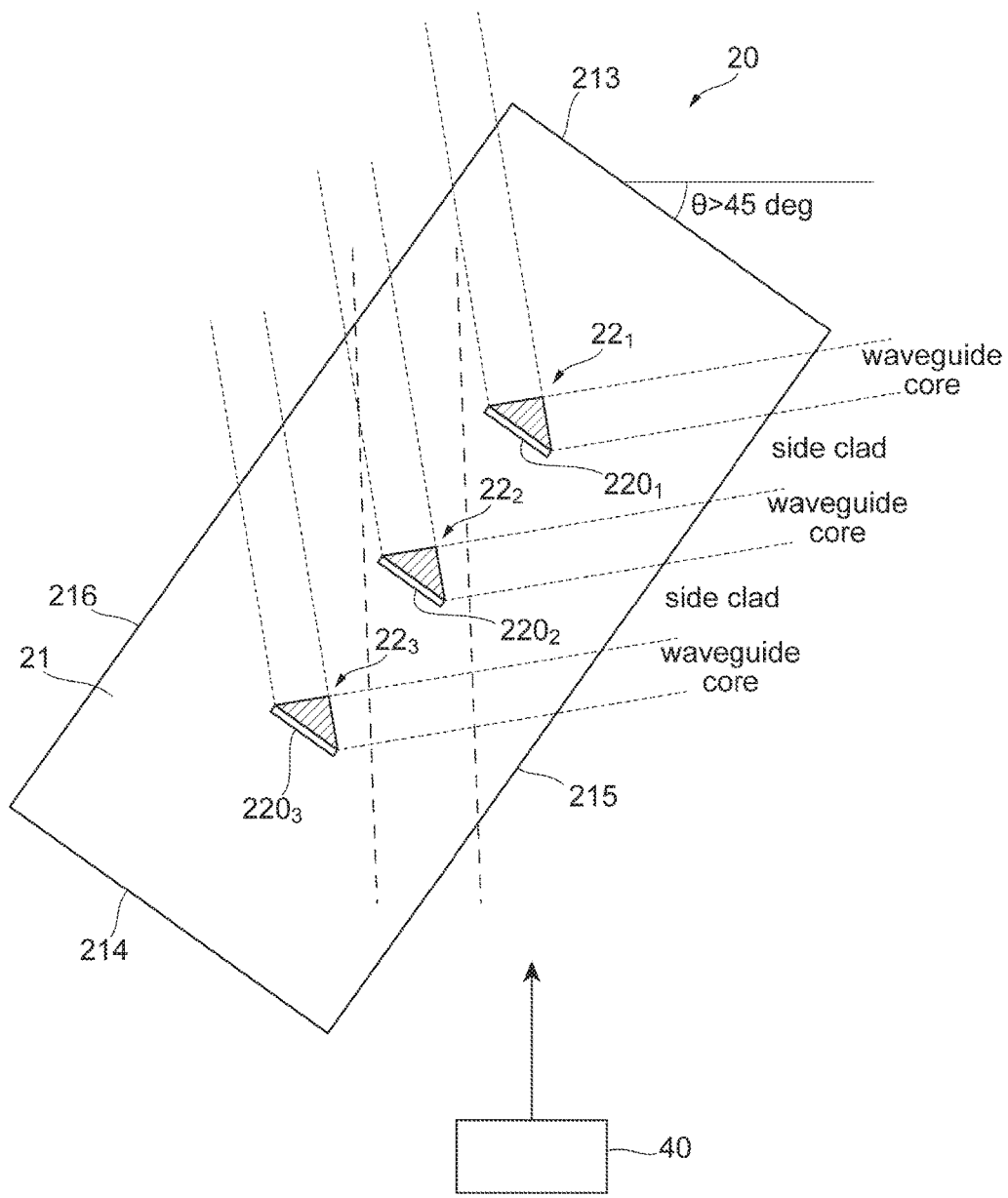
FIG. 8 depicts a detailed configuration for metal evaporation according to the first exemplary embodiment.

Referring to FIG. 8, there is shown a detailed configuration for metal evaporation at the metal evaporation step 102. As shown in FIG. 8, the plate structure 20 may be inclined so that the side surface 213 makes an angle θ with a plane perpendicular to the direction of metal evaporation from an evaporation source 40. The angle θ may be preferably larger than 45 degrees. By inclining the plate structure 20 in this manner, margins may be formed between the mirrors $22_1$ and $22_2$ and between the mirrors $22_2$ and $22_3$ when viewed from the evaporation source 40, as indicated by vertical coarse dashed lines. Thus, the side surfaces $220_1$, $220_2$, and $220_3$ of the mirrors $22_1$, $22_2$ and $22_3$ may be coated with metal without shadow effect. Further, each of fine dashed lines indicates an interface between the waveguide core and the side clad, which are not parts of the plate structure 20. A ratio of the thickness of the side clad to the thickness of the waveguide core may be greater than or equal to 1. A pitch between two adjacent waveguide cores may have no limitation.

Secondly, an explanation is given about the fabrication of waveguide corner structures of the waveguide corners (e.g., the waveguide corners 165 to 167 and 175 to 177 in FIG. 1) according to the second exemplary embodiment.

Figure 9:
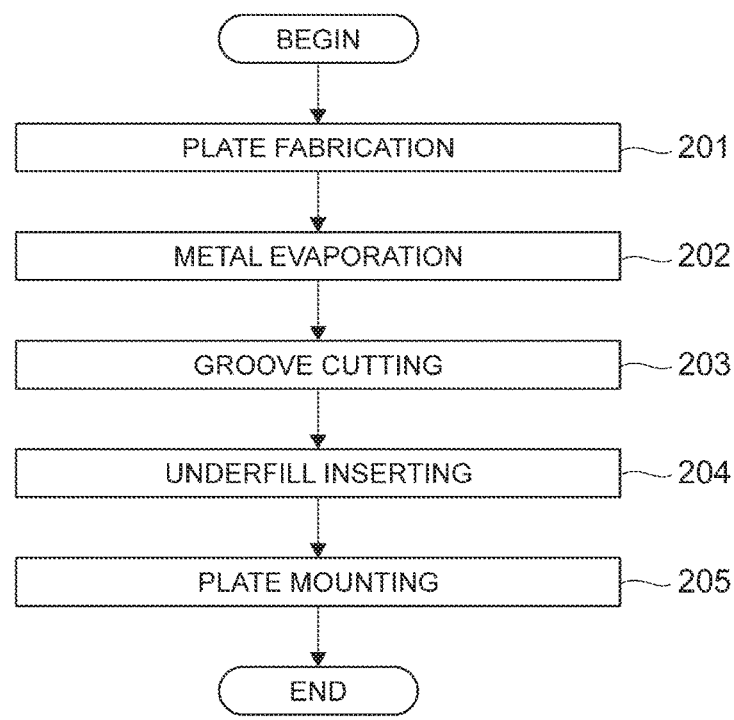
FIG. 9 depicts a flowchart representing an example of a fabrication procedure of waveguide corner structures according to the second exemplary embodiment.

Referring to FIG. 9, there is shown a flowchart representing an example of a fabrication procedure of the waveguide corner structures according to the second exemplary embodiment. As shown in FIG. 9, the fabrication procedure may include, in the time order, a plate fabrication step 201, a metal evaporation step 202, a groove cutting step 203, an underfill inserting step 204, and a plate mounting step 205.

Referring to FIGS. 10A and 10B, there are shown a side view and a bottom view of a plate structure 20 after the plate fabrication step 201 and the metal evaporation step 202 are completed. The plate structure 20 may include a plate 21 having a top surface 211, a bottom surface 212, and side surfaces 213 to 216. The plate structure 20 may further include mirrors $23_1$ to $23_8$. As shown in FIG. 10A, the mirrors $23_1$ to $23_8$ may be formed on the bottom surface 212 of the plate 21 at the plate fabrication step 201. Each of the mirrors $23_1$ to $23_8$ may have a reflection layer by being coated with metal (e.g., gold), as indicated by a thin rectangle on the left side thereof, at the metal evaporation step 202. As shown in FIG. 10B, the mirror $23_1$ which is in a concave pentagonal prism having side surfaces $230_1$, $231_1$, $232_1$, $233_1$, and $234_1$, the mirror $23_2$ which is in a concave pentagonal prism having side surfaces $230_2$, $231_2$, $232_2$, $233_2$, and $234_2$, the mirror $23_3$ which is in a concave pentagonal prism having side surfaces $230_3$, $231_3$, $232_3$, $233_3$, and $234_3$, and so on may be formed on the plate 20 at the plate fabrication step 201. The reflection layers may be formed on the side surfaces $230_1$ to $230_8$ of the mirrors $23_1$ to $23_8$ by being coated with metal, as indicated by a thin rectangle, at the metal evaporation step 202. Note that the plate structure 20 may be fabricated using high-precision printing techniques such as 2.5D printing techniques.

Figure 11A:
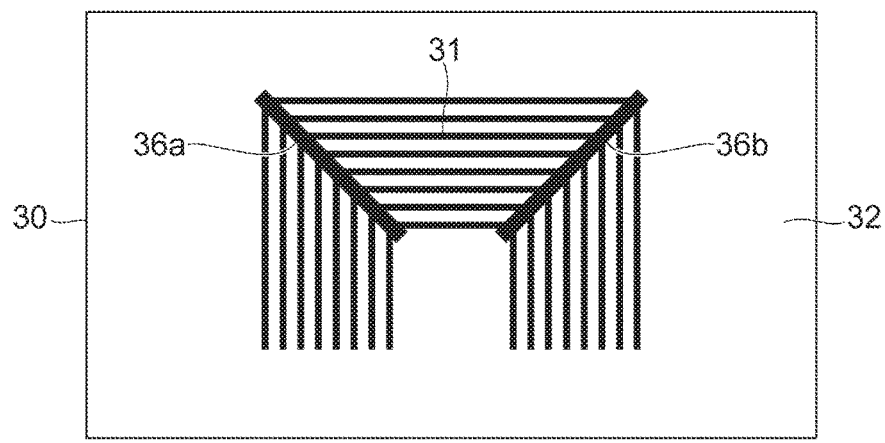
FIGS. 11A, 11B and 11C depict top views of a waveguide structure according to the second exemplary embodiment.
Figure 11B:
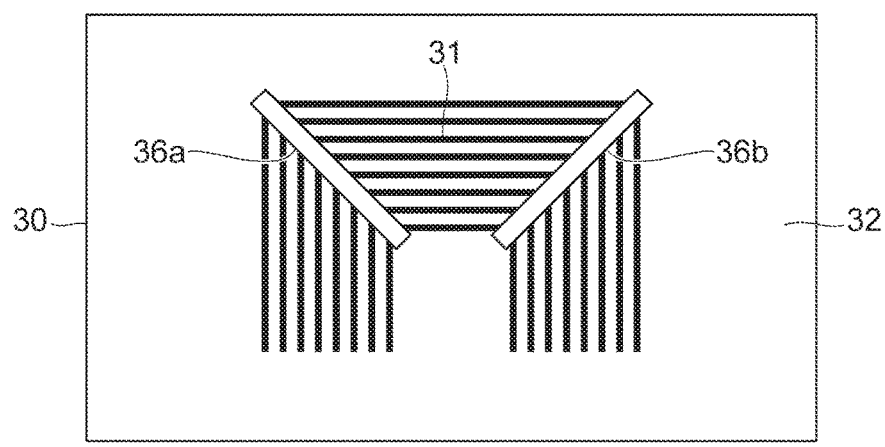
Figure 11C:
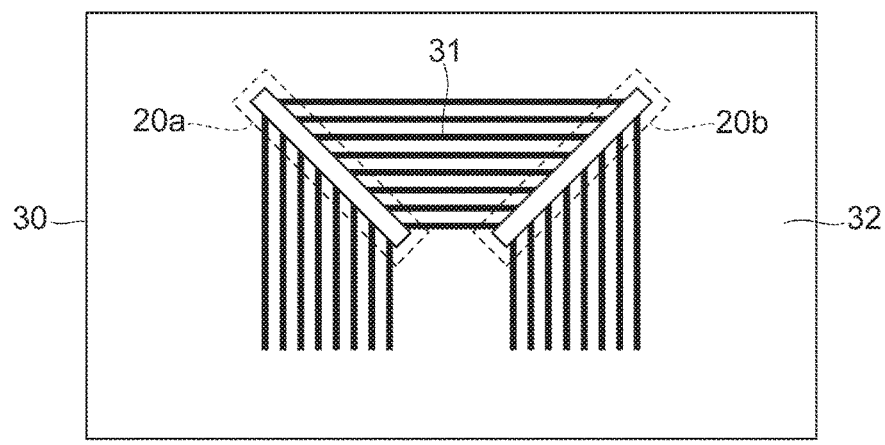

Referring to FIGS. 11A, 11B and 11C, there are shown top views of a waveguide structure 30 while the groove cutting step 203, the underfill inserting step 204, and the plate mounting step 205 are executed. The waveguide structure 30 may serve as one example of a waveguide member and include a waveguide core array 31 and a side clad 32. First, as shown in FIG. 11A, grooves 36a and 36b may be cut in the right and left corners of the waveguide core array 31, respectively, at the groove cutting step 203. Next, as shown in FIG. 11B, an underfill may be inserted in the grooves 36a and 36b at the underfill inserting step 204. Subsequently, as shown in FIG. 11C, plate structures 20a and 20b, each having the same structure as the plate structure 20, may be mounted from above on the right and left corners of the waveguide core array 31, respectively, at the plate mounting step 205. At this step, each of the mirrors of the plate structures 20a may be inserted to corresponding one of parts of the groove 36a and each of the mirrors of the plate structures 20b may be inserted to corresponding one of parts of the groove 36b.

Figure 12A:
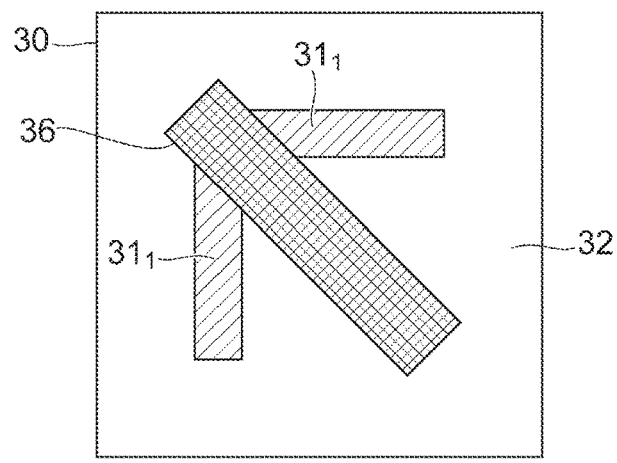
FIGS. 12A, 12B and 12C depict top views of the waveguide structure according to the second exemplary embodiment, which focus on one waveguide core.
Figure 12B:
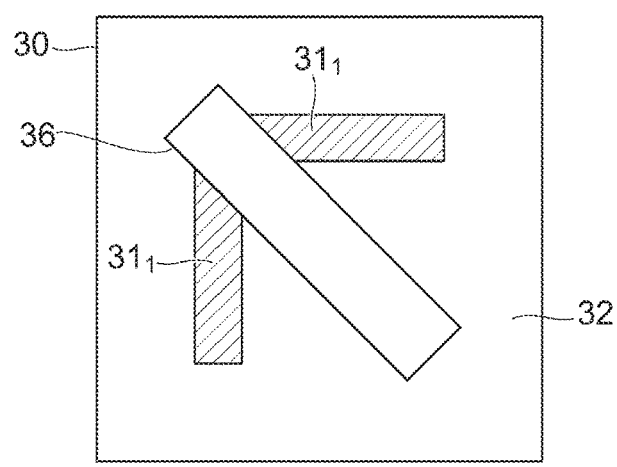
Figure 12C:
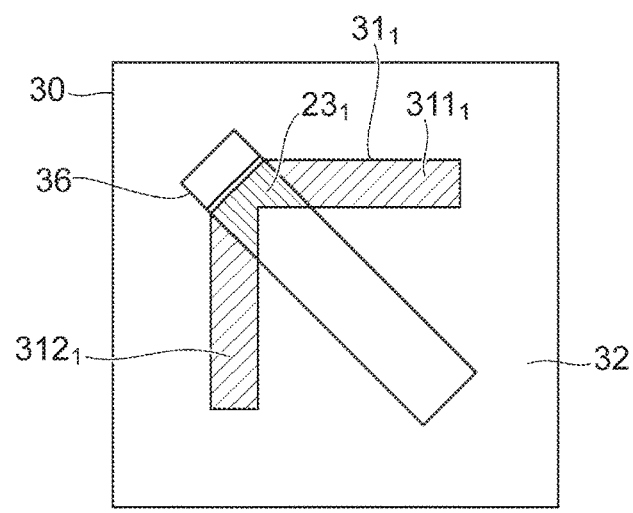

Referring to FIGS. 12A, 12B and 12C, there are shown top views of the waveguide structure 30, which focus on one waveguide core (assumed to be core number 1). First, as shown in FIG. 12A, a groove 36 may be cut in a corner of a waveguide core $31_1$ at the groove cutting step 203. Next, as shown in FIG. 12B, an underfill may be inserted in the groove 36 at the underfill inserting step 204. Subsequently, as shown in FIG. 12C, a mirror $23_1$ may be inserted to a part of the groove 36 overlapping the waveguide core $31_1$ at the plate mounting step 205. This configuration may enable the reflection layer of the mirror $23_1$ to change the direction of a light beam going through a linear part $311_1$ of the waveguide core $31_1$ so that the light beam goes into a linear part $312_1$ of the waveguide core $31_1$. Assuming that a core index is n1 and a clad index is n2, the mirror $23_1$ may have a refraction index equal to n1 and the underfill may have a refraction index equal to n2. Alternatively, the mirror $23_1$ may have a refraction index close to or higher than n1 and the underfill may have a refraction index close to or lower than n2. Note that the term "close to n" indicates "higher than a predetermined refraction index slightly lower than n and lower than a predetermined refraction index slightly higher than n". By setting the refraction index of the mirror $23_1$ and the underfill in this manner, the core-clad index contrast may be preserved between the mirror $23_1$ and the underfill. That is, even though the light beam going through the linear part $311_1$ meets an interface between the mirror $23_1$ and the underfill in the groove 36, the light beam may be totally reflected on the interface, and then the reflection layer of the mirror $23_1$ may change the direction of the light beam so that the light beam goes into the linear part $312_1$.

Next, an explanation is given about two examples of patterns of materials for the fabrication of the plate structure 20 at the plate fabrication step 201.

Also in the second exemplary embodiment, assuming that the waveguide core $31_1$ has a refraction index n1, and a top clad 33 and a bottom clad 34 have a refraction index n2, the lower parts of the mirrors $23_1$ to $23_8$ may be formed of a material with a refraction index equal to n1, and the plate 21 and the upper parts of the mirrors $23_1$ to $23_8$ may be formed of a material with a refraction index equal to n2, like in FIG. 6B. Alternatively, the lower parts of the mirrors $23_1$ to $23_s$ may be formed of a material with a refraction index close to or higher than n1, and the plate 21 and the upper parts of the mirrors $23_1$ to $23_8$ may be formed of a material with a refraction index lower than the refraction index of the lower parts of the mirrors $23_1$ to $23_8$ (e.g., a refraction index close to or lower than n2). Further, the mirror $23_1$ may be inserted to the groove 36 so that the upper part of the mirror $23_1$ is positioned at the same level as the top clad 33 and the lower part of the mirror $23_1$ is positioned at the same level as the waveguide core $31_1$, like in FIG. 6C. By this configuration, a light beam may be totally reflected on an interface between the upper part and the lower part of the mirror $23_1$. Thus, optical loss of the light beam on the corner of the waveguide core $31_1$ may be small.

Meanwhile, assuming that the waveguide core $31_1$ has a refraction index n1, and a top clad 33 and a bottom clad 34 have a refraction index n2, both the plate 21 and the mirrors $23_1$ to $23_8$ may be formed of a uniform material with a refraction index equal to n1, like in FIG. 7B. Alternatively, both the plate 21 and the mirrors $23_1$ to $23_8$ may be formed of a material with a refraction index close to or higher than n1. Further, the mirror $23_1$ may be inserted to the groove 36 so that the mirror $23_1$ is positioned at the same level as the top clad 33 and the waveguide core $31_1$, like in FIG. 7C. This configuration may facilitate the fabrication of the plate structure 20, although it increases optical loss of the light beam on the corner of the waveguide core $31_1$ in comparison with the configuration explained with reference to FIGS. 6A, 6B and 6C.

Referring to FIG. 13, there is shown a detailed configuration for metal evaporation at the metal evaporation step 202. As shown in FIG. 13, the plate structure 20 may be inclined so that the top surface 211 makes an angle θ with a plane perpendicular to the direction of metal evaporation from an evaporation source 40. The angle θ may be preferably smaller than 45 degrees. By inclining the plate structure 20 in this manner, margins may be formed between the mirrors $23_1$ and $23_2$ and between the mirrors $23_2$ and $23_3$ when viewed from the evaporation source 40, as indicated by vertical coarse dashed lines. Thus, the side surfaces $230_1$, $230_2$, and $230_3$ of the mirrors $23_1$, $23_2$ and $23_3$ may be coated with metal without shadow effect. On the other hand, the side surfaces $231_1$, $231_2$, and $231_3$ of the mirrors $23_1$, $23_2$ and $23_3$ may not be coated with metal.

Thirdly, an explanation is given about the fabrication of waveguide corner structures of the waveguide corners (e.g., the waveguide corners 165 to 167 and 175 to 177 in FIG. 1) according to the third exemplary embodiment.

The fabrication procedure of the waveguide corner structures according to the third exemplary embodiment may be executed, as shown in FIGS. 2 to 5C, or FIGS. 9 to 12C.

Next, an explanation is given about a special example of the way of mounting the plate structure 20 on the waveguide structure 30 at the plate mounting step 105 or at the plate mounting step 205.

Figure 14A:
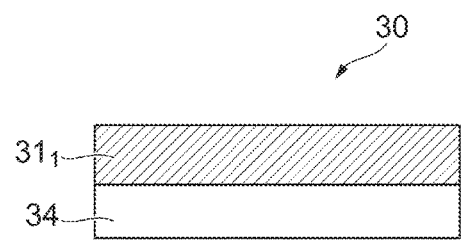
FIGS. 14A, 14B and 14C depict side views, respectively, of the waveguide structure, the plate structure, and an assembly of the plate structure and the waveguide structure according to the third exemplary embodiment.
Figure 14B:
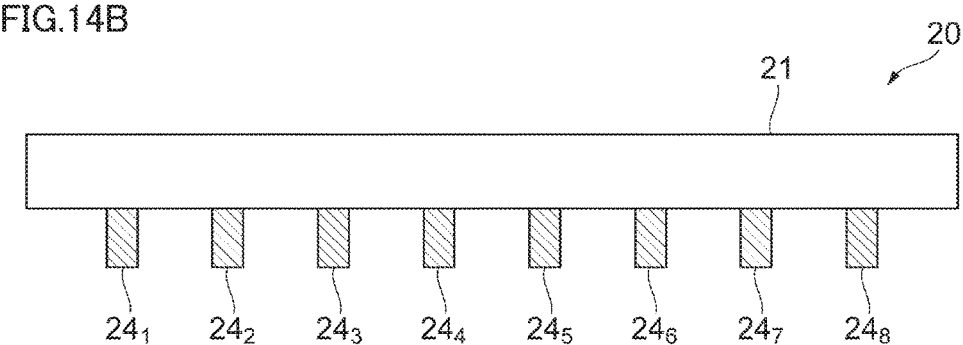
Figure 14C:
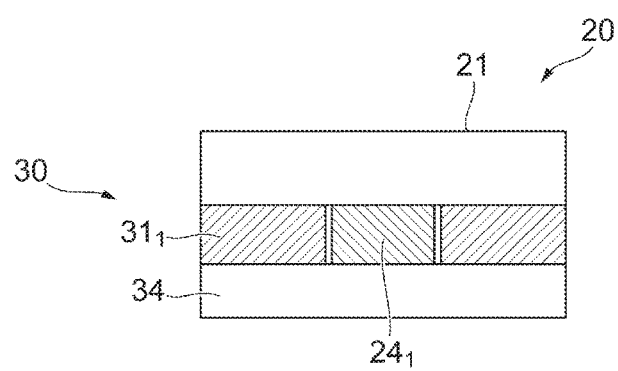

Referring to FIGS. 14A, 14B and 14C, there are shown side views, respectively, of the waveguide structure 30, the plate structure 20, and an assembly of the plate structure 20 and the waveguide structure 30. According to the third exemplary embodiment, the waveguide structure 30 may not include a top clad. The side view of the waveguide structure 30 is assumed to be a cross section view of a part including the waveguide core $31_1$. Thus, in FIG. 14A, the waveguide structure 30 shows the waveguide core $31_1$ and a bottom clad 34. As shown in FIG. 14B, the plate structure 20 may include a plate 21 and mirrors $24_1$ to $24_8$. The waveguide core $31_1$ is assumed to have a refraction index n1, and a bottom clad 34 is assumed to have a refraction index n2. In this case, the mirrors $24_1$ to $24_8$ may be formed of a material with a refraction index equal to n1, as indicated by hatched areas in FIG. 14B. Alternatively, the mirrors $24_1$ to $24_8$ may be formed of a material with a refraction index close to or higher than n1. The plate 21 may be formed of a material with a refraction index equal to n2, as indicated by a white area in FIG. 14B. Alternatively, the plate 21 may be formed of a material with a refraction index lower than the refraction index of the mirrors $24_1$ to $24_8$ (e.g., a refraction index close to or lower than n2). Further, as shown in FIG. 14C, the mirror $24_1$ may be inserted to the hole $35_1$ or the groove 36 so that the plate 21 serves as a top clad and the mirror $24_1$ is positioned at the same level as the waveguide core $31_1$. By this configuration, a light beam may be reflected by a total internal reflection mechanism on an interface between the plate 21 and the mirror $24_1$. Thus, optical loss of the light beam on the corner of the waveguide core $31_1$ may be small.

What is claimed is:
1. A waveguide corner structure, comprising:
a plate on which a plurality of mirrors are formed; and
a waveguide member including a plurality of waveguide cores and a plurality of holes, each of the plurality of holes being drilled in a portion replacing an angular bent portion of a corresponding one of the plurality of waveguide cores, wherein each of the plurality of mirrors corresponds to one of the plurality of waveguide cores and to one of the plurality of holes, and wherein the plate is mounted on the waveguide member so that each of the plurality of mirrors is inserted in its corresponding hole for a change of a direction of a light beam at the portion of its corresponding waveguide core.

2. The waveguide corner structure of claim 1, wherein each of the plurality of holes is circular, and each of the plurality of mirrors has a triangular shape so that the light beam inside the mirror and reaching a side of the mirror is reflected by a total internal reflection mechanism to decrease optical loss.

3. The waveguide corner structure of claim 1, wherein the waveguide member further includes a side clad covering the plurality of waveguide cores, and the side clad has a refraction index lower than a refraction index of the plurality of waveguide cores.

4. The waveguide corner structure of claim 3, wherein an underfill is injected into the plurality of holes, the plurality of mirrors have a refraction index close to or higher than the refraction index of the plurality of waveguide cores, and the underfill has a refraction index close to or lower than the refraction index of the side clad.

5. The waveguide corner structure of claim 1, wherein the waveguide member further includes a top clad and a bottom clad, the plate is mounted on a top surface of the waveguide member, lower parts of the plurality of mirrors have a refraction index close to or higher than a refraction index of the plurality of waveguide cores, the lower parts being positioned at a height of the plurality of waveguide cores, and upper parts of the plurality of mirrors have a refraction index lower than the refraction index of the lower parts, the upper parts being positioned at a height of the top clad.

6. The waveguide corner structure of claim 1, wherein the waveguide member further includes a top clad and a bottom clad, the plate is mounted on a top surface of the waveguide member, and the plurality of mirrors have a refraction index close to or higher than a refraction index of the plurality of waveguide cores.

7. The waveguide corner structure of claim 1, wherein the waveguide member includes no top clad and further includes a bottom clad, the plate is mounted on a top surface of the waveguide member, to serve as a top clad, the plurality of mirrors have a refraction index close to or higher than a refraction index of the plurality of waveguide cores, and the plate has a refraction index lower than the refraction index of the plurality of mirrors.

8. A waveguide corner structure, comprising:
a plate on which a plurality of mirrors are formed; and
a waveguide member including a plurality of waveguide cores and a groove, the groove being cut in an area extending over a plurality of portions replacing a plurality of angular bent portions of the plurality of waveguide cores, wherein each of the plurality of mirrors corresponds to one of the plurality of portions of the plurality of waveguide cores;
wherein the plate is mounted on the waveguide member so that each of the plurality of mirrors is inserted in the groove for a change of a direction of a light beam at its corresponding portion of the plurality of waveguide cores.

9. The waveguide corner structure of claim 8, wherein each of the plurality of mirrors has a shape with five sides so that the corresponding one of the plurality of waveguide cores is prolonged up to a reflective surface of the mirror, two of the five sides being parallel and coming near edges of the groove.

10. The waveguide corner structure of claim 8, wherein the waveguide member further includes a side clad covering the plurality of waveguide cores, and the side clad has a refraction index lower than a refraction index of the plurality of waveguide cores.

11. The waveguide corner structure of claim 10, wherein an underfill is injected into the groove, the plurality of mirrors have a refraction index close to or higher than the refraction index of the plurality of waveguide cores, and the underfill has a refraction index close to or lower than the refraction index of the side clad.

12. The waveguide corner structure of claim 8, wherein the waveguide member further includes a top clad and a bottom clad, the plate is mounted on a top surface of the waveguide member, lower parts of the plurality of mirrors have a refraction index close to or higher than a refraction index of the plurality of waveguide cores, the lower parts being positioned at a height of the plurality of waveguide cores, and upper parts of the plurality of mirrors have a refraction index lower than the refraction index of the lower parts, the upper parts being positioned at a height of the top clad.

13. The waveguide corner structure of claim 8, wherein the waveguide member further includes a top clad and a bottom clad, the plate is mounted on a top surface of the waveguide member, and the plurality of mirrors have a refraction index close to or higher than a refraction index of the plurality of waveguide cores.

14. The waveguide corner structure of claim 8, wherein the waveguide member includes no top clad and further includes a bottom clad, the plate is mounted on a top surface of the waveguide member, to serve as a top clad, the plurality of mirrors have a refraction index close to or higher than a refraction index of the plurality of waveguide cores, and the plate has a refraction index lower than the refraction index of the plurality of mirrors.

15. A waveguide corner structure, comprising:
a plate on which a plurality of mirrors are formed; and
a waveguide member including a plurality of waveguide cores, a side clad covering the plurality of waveguide cores, a plurality of holes, and an underfill injected into the plurality of holes, the plurality of waveguide cores having each of the plurality of holes being drilled in a portion replacing an angular bent portion of corresponding one of the plurality of waveguide cores, wherein
the plate is mounted on the waveguide member so that each of the plurality of mirrors is inserted in corresponding one of the plurality of holes for a change of a direction of a light beam at the portion of a corresponding one of the plurality of waveguide cores.

16. The waveguide corner structure of claim 15, wherein each of the plurality of holes is circular, and each of the plurality of mirrors has a triangular shape so that the light beam inside the mirror and reaching a side of the mirror is reflected by a total internal reflection mechanism to decrease optical loss.

17. The waveguide corner structure of claim 15, wherein the side clad has a refraction index lower than a refraction index of the plurality of waveguide cores, the plurality of mirrors have a refraction index close to or higher than the refraction index of the plurality of waveguide cores, and the underfill has a refraction index close to or lower than the refraction index of the side clad.

18. The waveguide corner structure of claim 15, wherein the waveguide member further includes a top clad and a bottom clad, the plate is mounted on a top surface of the waveguide member, lower parts of the plurality of mirrors have a refraction index close to or higher than a refraction index of the plurality of waveguide cores, the lower parts being positioned at a height of the plurality of waveguide cores, and upper parts of the plurality of mirrors have a refraction index lower than the refraction index of the lower parts, the upper parts being positioned at a height of the top clad.

19. The waveguide corner structure of claim 15, wherein the waveguide member further includes a top clad and a bottom clad, the plate is mounted on a top surface of the waveguide member, and the plurality of mirrors have a refraction index close to or higher than a refraction index of the plurality of waveguide cores.

20. The waveguide corner structure of claim 15, wherein the waveguide member includes no top clad and further includes a bottom clad, the plate is mounted on a top surface of the waveguide member, to serve as a top clad, the plurality of mirrors have a refraction index close to or higher than a refraction index of the plurality of waveguide cores, and the plate has a refraction index lower than the refraction index of the plurality of mirrors.

\* \* \* \* \*